(12) United States Patent
Elsässer

(10) Patent No.: US 7,387,116 B2
(45) Date of Patent: Jun. 17, 2008

(54) PISTON ENGINE AND RESPECTIVE OPERATING METHOD

(75) Inventor: Alfred Elsässer, Keltern (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 11/788,449

(22) Filed: Apr. 20, 2007

(65) Prior Publication Data
US 2007/0251513 A1    Nov. 1, 2007

(30) Foreign Application Priority Data
Apr. 28, 2006   (DE) .................. 10 2006 020 349

(51) Int. Cl.
*F02D 41/00* (2006.01)
(52) U.S. Cl. ...................... 123/673; 123/399
(58) Field of Classification Search ............ 123/399, 123/305, 295, 90.11, 90.15, 568.11, 568.14, 123/672–673, 699; 73/118.2; 701/103–105, 701/108–109
See application file for complete search history.

(56) References Cited

U.S. PATENT DOCUMENTS

| | | | |
|---|---|---|---|
| 5,353,763 A | 10/1994 | Schatz | |
| 6,053,154 A | 4/2000 | Pott | |
| 6,325,056 B1 | 12/2001 | Weining et al. | |
| 6,651,492 B2 * | 11/2003 | Kolmanovsky et al. | 73/118.2 |
| 6,666,197 B2 | 12/2003 | Bayer | |
| 6,672,060 B1 * | 1/2004 | Buckland et al. | 60/602 |
| 6,792,927 B2 * | 9/2004 | Kobayashi | 123/673 |
| 6,830,042 B2 * | 12/2004 | Ikemoto | 123/673 |
| 6,837,232 B2 * | 1/2005 | Yamashita | 123/694 |
| 7,103,467 B2 * | 9/2006 | Takahashi et al. | 701/109 |
| 7,267,100 B2 * | 9/2007 | Nakagawa et al. | 123/376 |
| 7,267,117 B2 * | 9/2007 | Tonetti et al. | 123/704 |
| 2004/0084015 A1 * | 5/2004 | Sun et al. | 123/399 |

FOREIGN PATENT DOCUMENTS

| | | |
|---|---|---|
| DE | 38 39 611 | 5/1990 |
| DE | 42 36 008 | 4/1994 |
| DE | 43 08 931 | 9/1994 |

(Continued)

OTHER PUBLICATIONS

Variable Ventilsteuerung II, 2004, by Prof. Dr.-Ing. Stefan Pischinger (Hrsg.).

*Primary Examiner*—Hai H Huynh
(74) *Attorney, Agent, or Firm*—Collard & Roe, P.C.

(57) ABSTRACT

An operating method is for a piston engine (1). The piston engine includes a plurality of cylinders (6) having intake valves (9), exhaust valves (10), combustion chambers (7), and pistons (8). A fresh gas system (2) contains an extra valve (13) assigned to the cylinders (6), a fuel system (5) and an exhaust system (4). The smooth running of the piston engine (1), includes having a fuel/fresh gas ratio in the exhaust gas being measured selectively for each cylinder in the exhaust system (4). The fuel system (5) is operated in such a way that it supplies the same amount of fuel to all combustion chambers (7) in steady-state operation of the piston engine (1). The extra valve (13) is operated in such a way that the quantity of fresh gas supplied to the combustion chambers (7) in steady-state operation is adjusted selectively for each cylinder as a function of the measured fuel/fresh gas ratio.

10 Claims, 1 Drawing Sheet

FOREIGN PATENT DOCUMENTS

Figure 1:
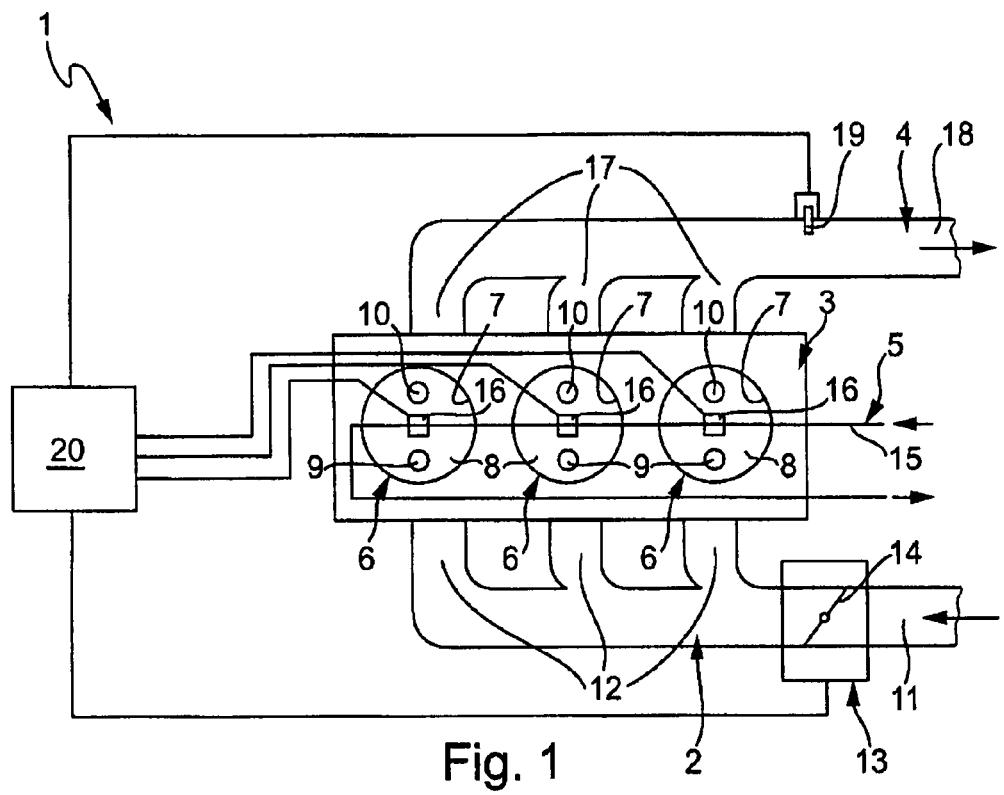

| | | |
|---|---|---|
| DE | 197 31 129 | 1/1999 |
| DE | 199 03 721 | 7/2000 |
| DE | 102 06 906 | 11/2003 |
| EP | 0 547 566 | 6/1993 |
| EP | 1 189 916 | 3/2002 |
| WO | PCT/DE96/00760 | 5/1996 |

* cited by examiner

PISTON ENGINE AND RESPECTIVE OPERATING METHOD

The present invention relates to a method for operating a piston engine, in particular in a motor vehicle, having the features of the preamble of Claim 1. The invention also relates to a piston engine, in particular in a motor vehicle, having the features of the preamble of Claim 8.

EP 0 547 566 B1 describes a piston engine that has multiple cylinders having intake valves, exhaust valves, combustion chambers and pistons adjustable therein in the usual way. In addition, the piston engine comprises a fresh gas system for supplying the combustion chambers with fresh gas, a fuel system for supplying the combustion chambers with fuel and an exhaust system for removing exhaust gas from the combustion chambers. With the known piston engine, the fresh gas system for each cylinder contains an extra valve which is arranged upstream from the intake valve of the respective cylinder. With the help of these extra valves, with the known piston engine the fresh gas supply to the combustion chambers can be influenced in such a way that the temperature established in the respective cylinder goes beyond the adiabatic final compression temperature. This method of operating the piston engine may also be referred to as heat charging.

An operating method referred to as pulse charging is known from DE 43 08 931 C2 for a piston engine; in this method, the respective intake valve is closed briefly during an intake stroke of the respective piston in the respective combustion chamber. The resulting dynamic flow effects lead to the desired pulse charging of the respective combustion chamber.

It is known from Pischinger, "Variable Ventilsteuerung II" [Variable Valve Control II], Expert Verlag, pages 244 to 260, that the fresh gas system may be dethrottled upstream from intake valves in a piston engine, in which case to implement the fresh gas charging which depends on the particular load status of the piston engine, the opening and closing times of the intake valves are adapted accordingly. The dethrottled or throttle-free fresh gas system is characterized by the absence of a throttle valve, which is upstream from a fresh gas distributor in a collecting line in a traditional fresh gas system to throttle the fresh gas supply of the combustion chambers as a function of the prevailing load state of the piston engine in partial load operation of the piston engine. The throttled fresh gas supply is problematical, because the throttle losses associated with this in charge cycle operation are comparatively high. The quality of the combustion process suffers and leads to comparatively poor emission values and increased fuel consumption values. In contrast with that, the quality of the combustion process can be improved significantly with a throttle-free or dethrottled fresh gas system, which leads to reduced emission values and fuel consumption values.

To be able to implement the desired control of fresh gas charging, i.e., the fresh gas quantity flow with a dethrottled fresh gas system, the known piston engine operates with an electromagnetic valve control which makes it possible to arbitrarily open and close the intake valves. Such electromagnetic valve controls are much more expensive than traditional valve drives controlled by camshafts, however.

Furthermore, an inhomogeneous distribution of fresh gas among the individual combustion chambers can also be observed with traditional piston engines. This inhomogeneity is the result of geometric properties and technical flow conditions of the fresh gas system. For example, the fresh gas system for the individual combustion chambers varies due to varying branches, curves, cross sections and lengths in the fresh gas lines, due to varying tolerances within the valve drive and due to differences in wear.

In particular the aforementioned properties of the fresh gas system may change over a period of time, in particular due to wear.

These inhomogeneities within the fresh gas feed lead to problems in combustion engines in which a predetermined fuel/fresh gas ratio ($\lambda$ value) should be maintained. For example, the introduction of torque into a crankshaft driven by the pistons can vary from one cylinder to the next, if the quantity of fresh gas in the cylinders fluctuates with a constant fuel supply. An uneven distribution of torque along the cylinders leads to uneven engine running, which can in turn cause premature wear on a piston engine. Apart from this, the desired $\lambda$ values cannot be maintained, with the corresponding consequences in terms of emissions and fuel consumption.

The present invention relates to the problem of demonstrating a possibility of improving the engine running in particular and/or improving the adherence to the desired $\lambda$ values in a piston engine of the type defined in the preamble.

This problem is solved according to this invention by the subjects of the independent claims. Advantageous embodiments are the subjects of the dependent claims.

The present invention is based on the general idea of controlling the respective extra valve in such a way that the quantity of fresh gas supplied to the individual combustion chambers can be adjusted or at least influenced selectively for the given cylinder, i.e., separately for each cylinder and independently of the other cylinders. With the help of the extra valve(s) with each cylinder, the $\lambda$ value can be adjusted more or less accurately at a predetermined target value in conjunction with a measurement of the $\lambda$ value that is selective for each cylinder. In this way, geometric and/or fluidic differences in the fresh gas system can be equalized in the fresh gas supply. In addition, cylinder-selective addition of fresh gas by means of the respective extra valve within the respective steady-state operating state of the piston engine allows the same quantity of fuel for all cylinders to be supplied through the fuel system. On reaching the target value for the fuel/air ratio with the same quantity of fuel-supplied to all cylinders, the introduction of torque into the crankshaft is essentially the same at all cylinders, thus achieving uniform running of the engine.

It is especially advantageous with this invention that influences on the fresh gas supply to the individual combustion chambers, which occur only after a certain period of time, e.g., due to wear, can be compensated for each cylinder separately by an appropriate adaptation in the control of the extra valve.

This invention is especially advantageous with piston engines which should be operated with a fuel/air ratio of 1.0, because with such a $\lambda=1$ concept, deviations in the sense of a lean mixture can significantly exacerbate emission values and the efficiency of the piston engine and deviations in the sense of a rich mixture significantly reduce the torque generated at the respective cylinder.

In addition, the present invention is especially suitable for piston engines in which the fresh gas system is designed to be dethrottled, i.e., throttle-free. The extra valve may be used for metered addition of the quantity of fresh gas to be supplied to the individual combustion chambers.

It is noteworthy that such an extra valve for the admixture of the quantity of fresh gas is always switched between two switch positions, where the quantity of fresh gas supplied to the respective combustion chamber is controlled by the opening time of the extra valve. In its open state, the extra valve has a comparatively small flow resistance, so that it lacks the throttle effect of a traditional throttle valve.

Other important features and advantages of the invention are derived from the subclaims, the drawings and the respective description of the figures on the basis of the drawings.

It is self-evident that the features mentioned above and those yet to be explained below may be used not only in the particular combination indicated but also in other combinations or alone without going beyond the scope of the present invention.

Preferred exemplary embodiments of the invention are illustrated in the drawings and explained in greater detail in the following description, where the same reference notation is used to refer to the same, similar or functionally identical components. In schematic diagrams, FIGS. 1 and 2 each show a greatly simplified basic diagram like a circuit diagram of a piston engine but in various embodiments.

Figure 2:
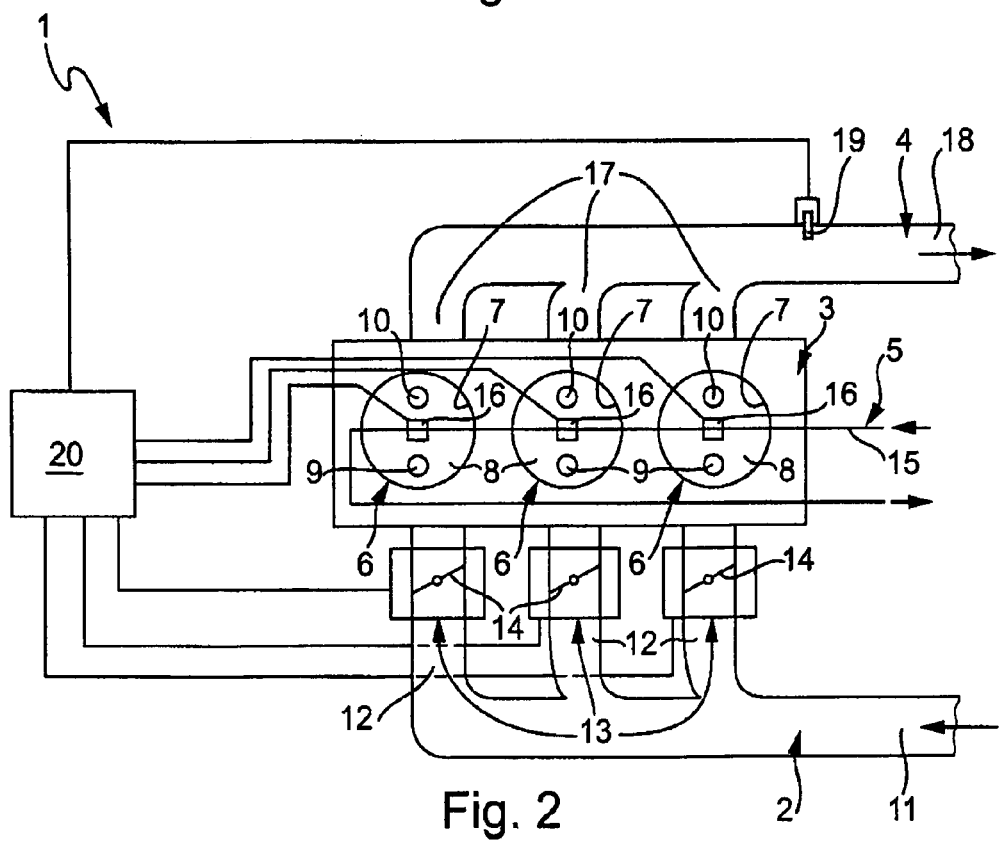

According to FIGS. 1 and 2, a piston engine 1, preferably installed in a motor vehicle, comprises a fresh gas system 2, an engine block 3, an exhaust system 4 and a fuel system 5. In addition, the piston engine 1 has several cylinders 6 in its engine block 3, each cylinder containing a combustion chamber 7 in which a piston 8 is arranged with an adjustable stroke and in which a charge cycle can be controlled with the help of at least one intake valve 9 and at least one exhaust valve 10. Corresponding valve drives for controlling the gas exchange valves 9, 10 are not shown here for the sake of simplicity.

The fresh gas system 2 serves to supply fresh gas, usually air, to the combustion chambers 7. To do so, the fresh gas system 2 has a joint fresh gas line 11 from which a single fresh gas pipe 12 leads away for each cylinder 6.

In the embodiment shown in FIG. 1, the fresh gas system 2 has an extra valve 12 in the fresh gas line 11, i.e., upstream from the fresh gas pipes 12 and in particular upstream from the intake valves 9. In contrast with that, FIG. 2 shows an embodiment in which such an extra valve 13 is arranged in each fresh gas pipe 12. In the case of an engine block 3 having two cylinder banks, the fresh gas system 2 may have two fresh gas lines 11, with one such extra valve 13 being arranged in each.

The respective extra valve 13 is adjustable at least between a closed position and an open position. A corresponding final controlling element is labeled here as 14 and may be designed as a flap valve, for example, in particular a butterfly valve. No actuator for driving the respective final controlling element 14 is shown here. The respective actuator is characterized in that it allows extremely short switching times for the respective switching device 14. In particular, this is a high-speed actuator that operates electromagnetically, for example, and permits switching times of less than 5 ms for the respective switching device, in particular less than 3 ms.

With the preferred embodiments shown here, the fresh gas system 2 is designed to be dethrottled, i.e., throttle-free. This means that the fresh gas system 2 does not include a throttle mechanism in the traditional sense for fresh gas quantity control, which works with load-dependent throttling of the fresh gas flow. The fresh gas quantity control is implemented here by a corresponding opening and closing of the respective extra valve 13. For example, the quantity of fresh gas supplied to a certain cylinder 6 during one intake stroke of the respective piston 8 while the intake valve 9 is open is determined by the opening duration of the respective extra valve 13. The fresh gas system 2 is designed to be throttle-free and/or dethrottled at least upstream from the extra valve 13 and/or upstream from the extra valves 13 and thus does not include any special throttle mechanism upstream from the extra valve(s) 13.

The fuel system 5 is designed here as a common rail system, for example, and accordingly comprises a high-pressure line 15 to which individual injectors 16 are connected, each injector being assigned to one of the combustion chambers 7. The fuel system 9 serves to supply fuel to the combustion chambers 7.

The exhaust gas system 4 comprises here a separate exhaust pipe 17 for each cylinder 6, so that the exhaust gas can be removed from the respective assigned combustion chamber 7 through a separate exhaust pipe. The exhaust pipes 17 open into a common exhaust line 18 of the exhaust system 4. A λ sensor 19 is arranged in or on the exhaust line 18, i.e., downstream from the exhaust pipes 17. This λ sensor 19 is designed here as a high-speed sensor such that it is capable of measuring λ values, i.e., fuel/fresh gas ratios λ in the exhaust gas selectively for the different cylinders. This means that the quantities of exhaust gas emitted by the individual cylinders 6 in succession can be tested separately by the λ sensor 19 with regard to their λ value.

The λ sensor 19, like the injectors 16 and the extra valve(s) 13, is connected to a controller 20. The controller 20 may assign the λ values determined by the λ sensor 19 to the individual cylinders 6 to thereby ascertain the cylinder-selective λ values. It is clear that instead of a single λ sensor 19 that is arranged in the exhaust line 19, multiple λ sensors 19 arranged in the individual exhaust pipes 17 may also be used.

The controller 20 serves to analyze the measured values of the λ sensor 19 and to operate the injectors 16, i.e., the fuel system 5, and to operate the extra valve 13 or extra valves 13. The controller is designed in terms of software and/or hardware so that it is able to operate, i.e., control the components connected to it, in particular the extra valve(s) 13 and the fuel system 5 in such a way that the method described below for operating the piston engine 1 can be implemented with the help of the controller 20.

During operation of the piston engine 1, cylinder-selective λ values, also referred to below as $\lambda_{actual}$ values, may optionally be measured with the cooperation of the controller 20. The fuel system 5 is operated in a steady-state operating state of the piston engine 1, i.e., at a constant load and rotational speed, so that the same quantity of fuel is supplied to all combustion chambers 7. This quantity of fuel is obtained as a function of the respective operating state and/or load state of the piston engine 1 and is optimized with regard to engine efficiency and pollution emissions. The corresponding fuel quantities are stored in controller 20. In addition, a target value $\lambda_{setpoint}$ for the fuel/fresh gas ratio λ is also stored in the controller 20 for the respective steady-state operating state, such that when this ratio is maintained, the piston engine 1 is optimized with regard to fuel consumption and pollution emissions. The respective extra valve 13 is then operated and/or controlled in such a way that the quantity of fresh gas supplied to the individual combustion chambers 7 in said steady-state operating state is adjusted in a cylinder-selective manner as a function of the measured fuel/fresh gas ratio $\lambda_{actual}$ such that the target value $\lambda_{setpoint}$ for the fuel/fresh gas ratio λ can be achieved. For controlling the respective extra valve 13, the fuel/fresh gas ratio λ of a combustion process that has taken place in the respective cylinder 6 at an earlier point in time is thus used to optimize the next combustion process in this cylinder 6 with regard to the target value $\lambda_{setpoint}$ for the fuel/fresh gas ratio λ. In the case of a controller 20 that reacts especially rapidly, the respective extra valve 13 will be controlled as a function of the λ value prevailing in the respective cylinder 6 in the immediately preceding combustion process.

An embodiment in which the target value $\lambda_{setpoint}$ of the fuel/fresh gas ratio is λ=1 is especially advantageous. At a stoichiometric ratio between fuel and fresh gas, the full conversion rate of a three-way catalytic converter is achieved.

In addition, a closed control loop may be designed for operation of the respective extra valve 13. The fuel/fresh gas ratio λ, which is measured separately for each cylinder 6, then forms an actual value and is therefore referred to as $\lambda_{actual}$. The regulating goal here is to adjust the target value $\lambda_{actual}$ for the fuel/fresh gas ratio λ. The controlled variable is the fresh gas quantity supplied to the respective cylinder 6. The quantity of fresh gas is then adjusted through corresponding activation of the extra valve 13 or the extra valves 13 separately for each cylinder 6.

In a preferred embodiment, a predetermined standard fresh gas quantity, which is the same for all cylinders 6, is assigned to the respective operating state of the piston engine 1, in particular in accordance with engine characteristics maps. Only if there are differences in the fuel/fresh gas ratio λ between the individual cylinders 6 during operation based on the cylinder-selective measurement of the λ value are these differences corrected through appropriate adaptation of the quantity of fresh gas supplied to the individual cylinders 6. The controller 20 thus accomplishes a cylinder-selective adaptation of the standard fresh gas quantity, which was originally the same for all cylinders 6, to thereby be able to adjust the quantity of fresh gas actually supplied to the individual cylinders 6 on a cylinder-selective basis.

The quantity of fresh gas is adjusted through appropriate operation and/or control of the extra valves 13. To do so, operating parameters of the respective extra valve 13 may be varied and/or adapted individually, i.e., selectively for each cylinder 6. It is possible here to change only a single operating parameter or to change multiple operating parameters. Operating parameters of the respective extra valve 13 that are adjustable selectively for each cylinder include, for example, without any claim at being complete, the opening duration of the respective extra valve 13, the opening point in time of the respective extra valve 13, the closing point in time of the respective extra valve 13, the opening cross section of the respective extra valve 13, i.e., the opening stroke in the case of a final controlling element 14 having an adjustable stroke, and the opening angle or angle of rotation in the case of a final controlling element 14 with adjustable rotation. Furthermore, with regard to the opening and closing points in time, their relative position in relation to the opening and closing points in time of the respective intake valves 9 may also be important.

The invention claimed is:

1. A method for operating a piston engine (1), in particular in a motor vehicle,
whereby the piston engine (1) has a plurality of cylinders (6) having intake valves (9), exhaust valves (10), combustion chambers (7) and pistons (8) adjustable therein,
whereby the piston engine (1) has a fresh gas system (2) for supplying fresh gas to the combustion chambers (7), the system comprising at least one extra valve (13) which is assigned to one or more or all the cylinders (6),
whereby the piston engine (1) has a fuel system (5) for supplying fuel to the combustion chambers (7),
whereby the piston engine (1) has an exhaust system (4) for removing exhaust gas from the combustion chambers (7),
wherein
a fuel/fresh gas ratio (λ) is measured in the exhaust gas selectively for each cylinder in the exhaust system (4),
the fuel system (5) is operated so that it supplies the same quantity of fuel to all combustion chambers (7) in a steady-state operating state of the piston engine (1),
the extra valve (13) is or the extra valves (13) are operated so that in steady-state operation of the piston engine (1) the quantity of fresh gas supplied to the combustion chambers (7) is adjusted selectively for each cylinder as a function of the measured fuel/fresh gas ratio ($\lambda_{actual}$) to achieve a target value ($\lambda_{setpoint}$) for the fuel/fresh gas ratio (λ) that is the same for all cylinders (6).

2. The method according to claim 1, wherein the target value ($\lambda_{setpoint}$) of the fuel/fresh gas ratio (λ) is equal to 1.

3. The method according to claim 1, wherein the quantity of fresh gas supplied is adjusted selectively for each cylinder in such a way that a standard quantity of fresh gas which is the same for all cylinders (6) and is assigned to the particular operating state of the piston engine (1) is adapted as a function of a deviation in the cylinder-selective fuel/fresh gas ratio ($\lambda_{actual}$) from the target value ($\lambda_{setpoint}$) in a selective manner for each cylinder.

4. The method according to claim 1, wherein the cylinder-selective adjustment of the quantity of fresh gas supplied is accomplished by varying and/or adapting the operating parameters of the extra valve (13) or extra valves (13) in a selective manner for each cylinder.

5. The method according to claim 4, wherein operating parameters of the respective extra cylinder (13) which can be varied and/or adapted in a selective manner for each cylinder comprise at least one of the following parameters: opening duration of the respective extra cylinder (13), opening point in time of the respective extra valve (13), closing point in time of the respective extra valve (13), opening cross section of the respective extra valve (13), opening stroke of the respective extra valve (13), opening angle of the respective extra valve (13).

6. The method according to claim 1, wherein the operation of the respective extra valve (13) as a function of the cylinder-selective fuel/fresh gas ratio (λ) is designed as a closed control loop for cylinder-selective adjustment of the target value ($\lambda_{setpoint}$) of the fuel/fresh gas ratio (λ) for all cylinders (6).

7. The method according to claim 1, wherein the fresh air system (2) is dethrottled and/or throttle-free.

8. A piston engine, in particular in a motor vehicle, comprising
a plurality of cylinders (6) having intake valves (9), exhaust valves (10), combustion chambers (7) and pistons (8) adjustable therein,
a fresh gas system (2) for supplying fresh gas to the combustion chambers (7), said fresh gas system having at least one extra valve (13) assigned to one or more or all cylinders (6),
a fuel system (5) for supplying fuel to the combustion chambers (7),
an exhaust system (4) for removing exhaust gas from the combustion chambers (7),
a controller (20) for operating the fuel system (5) and the extra valve (13) as a function of the operating state of the piston engine (1),
wherein the exhaust system (4) has at least one λ probe (19) that is linked to the controller (20) and is designed so that it allows a cylinder-selective measurement of the fuel/fresh gas ratio (λ) in the exhaust gas, the control (20) is designed so that it operates the fuel system (5) in such a way that, in a steady-state operating state of the piston engine (1), it supplies the same amount of fuel to all combustion chambers (7), and the extra valve (13) or extra valves (13) are operated in such a way that it/they adjust(s) the quantity of fresh gas supplied to the combustion chambers (7) as a function of the measured fuel/fresh gas ratio ($\lambda_{actual}$) in a selective manner for each cylinder in order to achieve a target value ($\lambda_{setpoint}$) for the fuel/fresh gas ratio (λ) which is the same for all cylinders.

9. The piston engine according to claim 8, wherein the target value ($\lambda_{setpoint}$) of the fuel/fresh gas ratio (λ) is equal to 1, and/or the fresh gas system (2) is dethrottled and/or throttle-free, and/or the fresh gas system (2) has at least one fresh gas line (11) that supplies fresh gas to the combustion chambers (6) through fresh gas pipes (12), whereby an extra valve (13) is arranged either in each fresh gas line (11) or in each fresh gas pipe (12).

10. The piston engine according to claim 8, wherein the controller (20) is designed for implementing the process features.

* * * * *